United States Patent [19]

Yoshimura

[11] Patent Number: 4,987,497
[45] Date of Patent: Jan. 22, 1991

[54] IMAGE EDITING METHOD FOR A DIGITAL COPIER

[75] Inventor: Tsuyoshi Yoshimura, Tokyo, Japan

[73] Assignee: Ricoh Company, Ltd., Tokyo, Japan

[21] Appl. No.: 384,450

[22] Filed: Jul. 25, 1989

[30] Foreign Application Priority Data

Aug. 4, 1988 [JP] Japan .................................. 63-193475

[51] Int. Cl.⁵ .............................................. H04N 1/40
[52] U.S. Cl. ..................................... 358/452; 358/453; 358/448
[58] Field of Search ....................... 358/452, 453, 448; 340/709

[56] References Cited

U.S. PATENT DOCUMENTS 4,345,313 8/1982 Knox .................................... 358/452

OTHER PUBLICATIONS

"Macprint" by Macintosh, 1983, Apple Computer, Inc.; Cupetino, Calif, p. 22.

Primary Examiner—Alvin E. Oberley
Assistant Examiner—Thomas D. Lee
Attorney, Agent, or Firm—Oblon, Spivak, McClelland, Maier & Neustadt

[57] ABSTRACT

An image editing method for a digital copier implements image editing in any of various erase modes which include an inside erase mode and a paint-out erase mode. The inside erase mode is to erase an image or images lying in a marked area which has been marked by a marker, while the paint-out erase mode is to erase only an image which has been painted out by a marker. When a mark provided by a marker is detected, any of the two different erase modes is selected automatically.

8 Claims, 5 Drawing Sheets

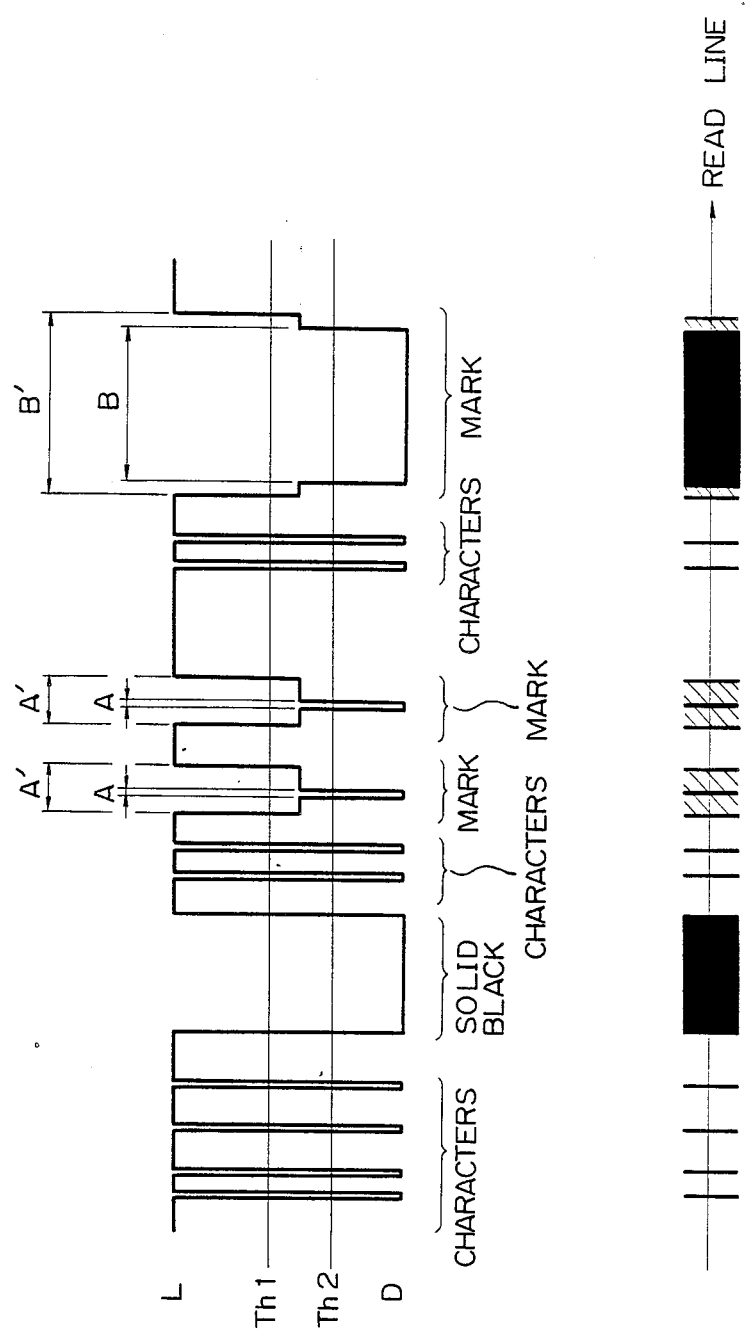

IMAGE EDITING METHOD FOR A DIGITAL COPIER

BACKGROUND OF THE INVENTION

The present invention relates to an image editing method for a digital copier.

With a digital copier which is attracting much attention today, an editing function is available for editing a document image in various manners so as to reproduce it in a desired form. For example, in an editing system generally referred to as a marker editing system, use is made of a pen or marker for marking a particular area of a document image to be edited, instead of picking up coordinates on a digitized by a pen. The marked area is detected by real-time processing to edit an image or images lying in that area in various manners. Typical of editing techniques known in the art is masking, trimming and negative-positive inversion. The marker editing system has various advantages over the other editing systems heretofore proposed, e.g., it eliminates the need for a digitizer and other special devices, limitations imposed on independent areas and those imposed on the shape of areas to be marked. However, limitations are still unavoidable because the marked areas themselves have to be further clearly distinguished from the other areas. It follows that, when a number of areas of a single document image are marked, unexpected processing is apt to occur to prevent a desired image from being produced. To cope with this problem, there is an increasing demand for an alternative marker editing system which is free from the conventional concept, i.e. a marked area.

SUMMARY OF THE INVENTION

It is therefore an object of the present invention to provide an image editing method for a digital copier which enhances free and effective image editing.

It is another object of the present invention to provide an image editing method for a digital copier which implements not only an inside erase mode for erasing an image lying in an area marked by a marker, but also a paint-out erase mode for erasing an image which is painted out by a marker itself.

It is a further object of the present invention to provide a generally improved image editing method for a digital copier.

An image editing method for a digital copier which effects predetermined editing with a document image having been marked by a marker of the present invention comprises the steps of providing a plurality of inside image processing modes for applying image editing processing to an image lying in a marked area which has been marked and surrounded by the marker, and providing at least one paint-out image processing mode for applying image editing processing to an image which has been marked and painted out by the marker itself.

BRIEF DESCRIPTION OF THE DRAWINGS

The above and other objects, features and advantages of the present invention will become more apparent from the following detailed description taken with the accompanying drawings in which:

FIG. 8 is a diagram showing a specific relationship between the output of a CCD (Charge Coupled Device) array, or image reader, and the image pattern being read.

DESCRIPTION OF THE PREFERRED EMBODIMENT

To better understand the present invention, a brief reference will be made to a prior art marker editing system.

Figure 1:
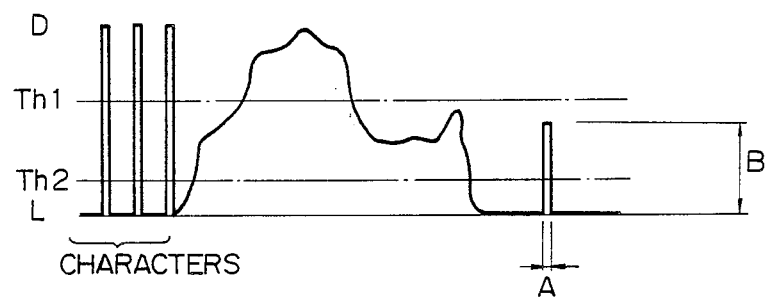
FIG. 1 is a diagram useful for understanding how a mark entered on a document image by a marker is recognized.
Figure 2:
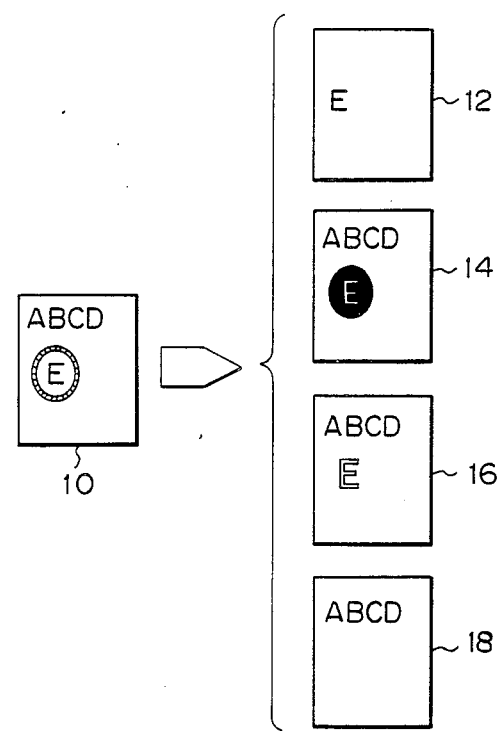
FIG. 2 shows specific image editing techniques which are applicable to images lying in an area having been marked by a marker.

A mark may be provided on a document by a halftone marker in the form of a pen, as is well known in the art. It has been customary to recognize a difference in density between white portions and black portions of a document in terms of a difference in reflectivity. Specifically, as shown in FIG. 1, a part of output levels of a CCD array or image reader, which lies between two threshold levels Th1 and Th2 and has predetermined durations in both of the main and subscanning directions are determined to represent a marker line. The area marked by the marker line is treated as a particular area, and various kinds of processing are selectively applied to the particular area. Some different kinds of processing which may be applied to the inside of such a particular area are shown in FIG. 2. In FIG. 2, a document with characters "ABCD" printed thereon is shown by way of example. When the character "E" is marked and trimming is applied thereto, a reproduction 12 will be produced; when negative-positive inversion is applied to the marked document 10, a reproduction 14 will be produced; and when framing is applied to the marked document 10, a reproduction 16 will be obtained. Further, when inside erase processing is effected with the document 10, a reproduction 18 will be achieved. It will be seen that all of the image editing implementations heretofore proposed are associated with images which lies in a particular area which is marked by a marker. In the description to follow, a mode for erasing images lying in a particular area as represented by the reproduction 18 will be referred to as an inside erase mode for convenience. An erase mode unique to the present invention which will be described will be referred to as a paint-out erase mode in distinction from the inside erase mode.

Figure 3A:
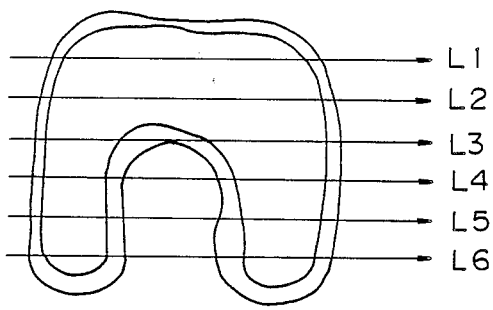
FIGS. 3A and 3B are diagrams representative of a process for reading a marked area one-dimensionally.
Figure 3B:
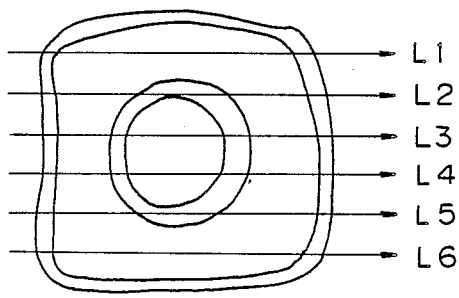

The the prior art system which edits images lying in a marked area as stated above suffer from various limitations which are necessary to characterize the marked area itself. For example, the limitations are that when one marked area lies in another and larger marked area, the outer mark should be provided with priority over the inner mark. When a marked area is locally recessed in a latter part thereof with respect to the subscanning direction, the recessed part should also be regarded as a part of the marked area. How to handle a discontinuous marker line is generally agreed upon also. With the prior art system, it is extremely difficult to determine whether a portion being scanned exists inside or outside a marked area, because the system reads a marked area one-dimensionally. Specifically, assume two marked areas having particular shapes as shown in FIGS. 3A and 3B. While both of the marked areas shown in FIGS. 3A and 3B are sequentially read from a scanning line L1 to a scanning line L4, whether the latter portion has a recessed configuration as shown in FIG. 3A or a closed double-mark configuration as shown in FIG. 3B and whether or not it lies in a marked area cannot be seen until the scanning proceeds to the last line L6. Such various conditions aggravate the chance of unexpected editing operations as the number of marks on a single document increases.

An image editing method embodying the present invention implements not only the traditional various kinds of processing applicable to images which exist in a marked area, but also a unique mode in which lines, alphanumeric characters, pictures or similar images to be erased are painted out directly by a marker so as to be erased themselves, i.e. the previously mentioned paint-out erase mode. More specifically, the present invention is derived from an unprecedented concept, i.e., editing an image painted out by a marker and which is distinguishable from the traditional concept of editing images which are surrounded by a marker line.

Figure 4:
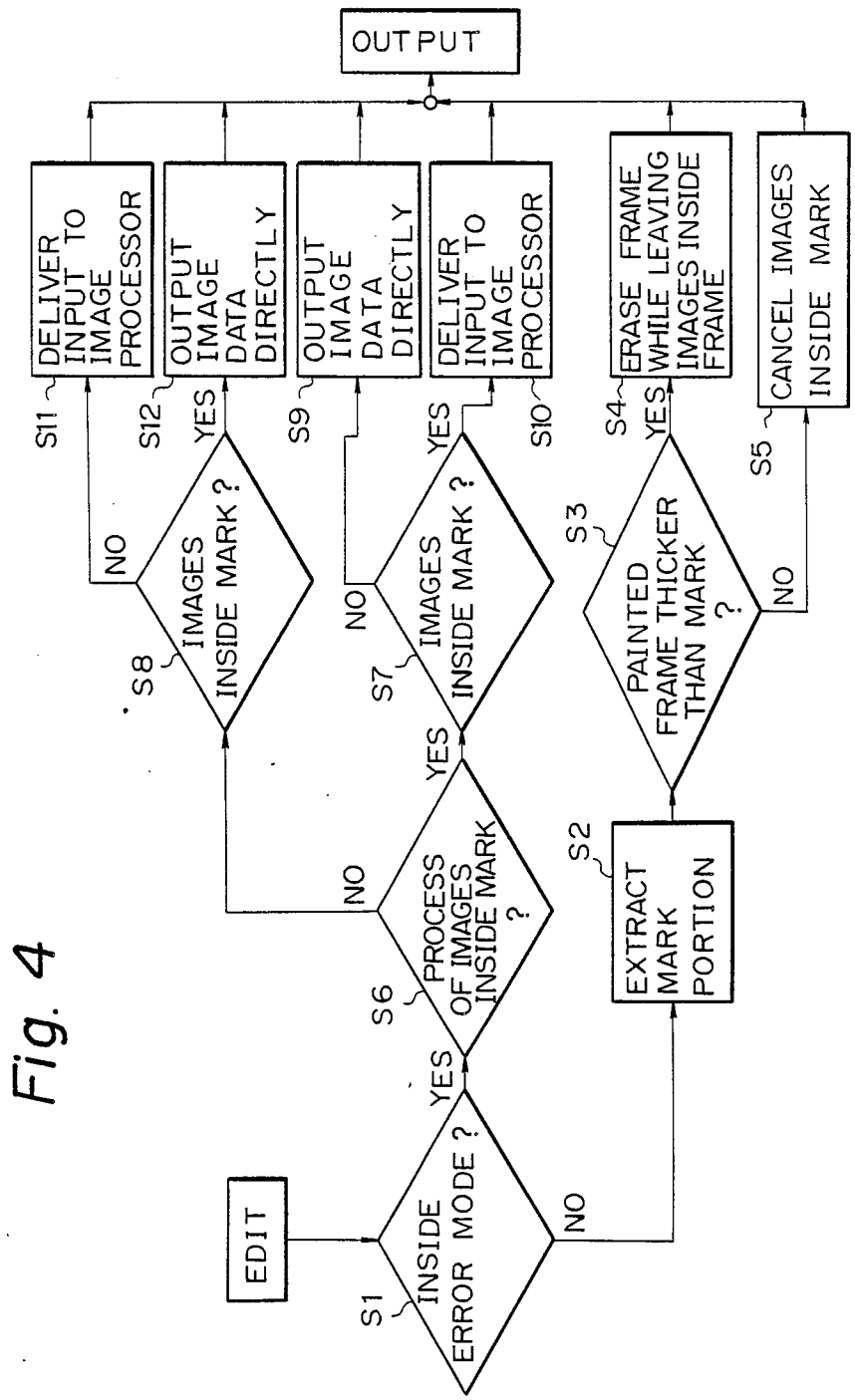
FIG. 4 is a flowchart demonstrating a specific procedure for practicing an image editing method of the present invention.
Figure 5:
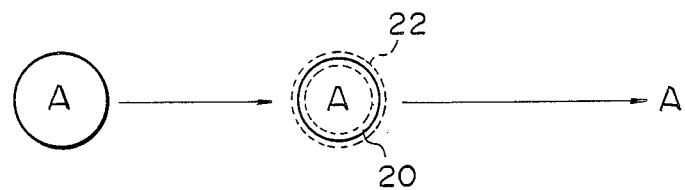
FIGS. 5 and 6 are diagrams showing image editing which is implemented by a paint-out erase mode particular to an image editing method of the present invention.
Figure 6:
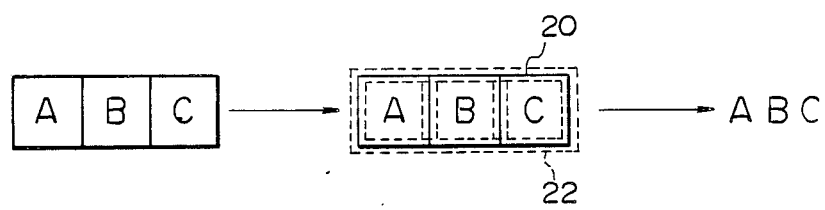

Referring to FIGS. 4, there is shown a flowchart demonstrating a specific procedure for practicing the method of the present invention. The procedure begins with a step S1 for determining whether or not the inside erase mode is selected. If the answer of the step S1 is NO, the program executes a step S2 for entering into the paint-out erase mode which is unique to the present invention. Specifically, assume that alphabet A is surrounded by a circular frame 20 as shown in FIG. 5 or alphabets A, B and C are surrounded by a square frame 20 as shown in FIG. 6, and that the each frame 20 itself has been painted out by a mark 22. Then, in the step S2, such a marked portion is extracted. The step S2 is followed by a step S3 in which the frame 20 and mark 22 are compared with respect to their thicknesses (step S3). If the ratio of the mark 22 to the frame 20 is relatively small, the image or images (alphabet A or alphabets ABC) in the frame 20 are outputted as they are (step S4), as shown in FIG. 5 or 6. If the mark 22 is sufficiently thicker than the frame 20, the images inside the mark 22 are cancelled by the same step as with the inside erase mode (step S5). If the inside erase mode is selected as determined in the step S1, which of the interior and exterior with respect to the mark should be processed is determined (step S6). If the answer of the step S6 is YES, a step S7 is executed; if it is NO, the program advances to a step S8. Each of the steps S7 and S8 is adapted to determine whether or not an image lying in a mark is to be processed. If the answer of any of the steps S7 and S8 is YES, image data are directly outputted (steps S9 and S12); if otherwise, the image data are fed to a conventional image processing device having image editing capabilities such as those shown in FIG. 2 (steps S10 and S11).

Figure 7:
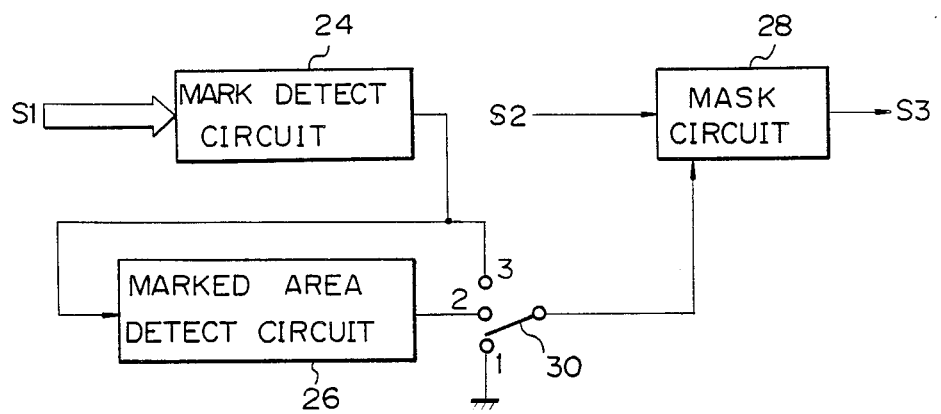
FIG. 7 is a block diagram schematically showing a specific construction of a mode switching circuit applicable to the present invention.

Referring FIG. 7, a specific construction of a mode switching circuit for switching the paint-out erase mode and the inside erase mode as stated above is shown. As shown, the circuit is made up of a mark detecting block 24, a marked area detecting blocks 26, a masking block 28, and a switch 30. These blocks 24, 26 and 28 may be implemented by the circuitry which is disclosed in Japanese Laid-Open Patent Application (Kokai) No. 62-19570 by way of example. The switch 30 has contacts 1, 2 and 3 for setting up a non-erase mode, the inside erase mode, and the paint-out erase mode, respectively. An image signal S1 is implemented as a multi-level image signal for mark detection, while image signals S2 and S3 are binarized image signals.

When the frame 20 shown in FIG. 5 or 6 is painted out by a marker, it will be erased by the paint-out erase mode of the illustrative embodiment. This unique mode is as advantageous as or advantageous over the inside erase mode. Specifically, the inside erase mode simply erases all the lines and rules around characters, while the paint-out mode of the illustrative embodiment erases only frames as represented by the frame 20 in FIGS. 5 and 6 while leaving characters as they are. Such processing has heretofore been impracticable except for the use of a white correcting paint.

FIG. 8 shows an output signal of CCD array which is representative of character portions, solid black portions, etc. As shown in the figure, the parts of the signal associated with the marking lines and the characters appear in characteristic forms. In the condition shown in FIG. 8, the image signal associated with the mark itself is cancelled when the mark width A' is greater than the line width A by more than a predetermined ratio. On the other hand, when the mark width B is sufficiently greater than the mark width B', it is preferable not to adopt the above-stated processing from the easy handling standpoint, i.e., the inside erase mode is more preferable.

In summary, in accordance with the present invention, a unique paint-out erase mode is available with a digital copier for erasing all the lines, characters and pictures which have been painted out by a marker by determining that they are not data. The present invention, therefore, contributes a great deal to the freedom of marker editing.

Various modifications will become possible for those skilled in the art after receiving the teachings of the present disclosure without departing from the scope of the present invention.

What is claimed is:

1. An image editing method for a digital copier which effects predetermined editing functions on a document which has been marked by a marking signal, comprising the steps of:

generating a marked area on a document which is input into a digital copier by surrounding a predetermined area of said document with a marking signal;

providing a plurality of inside image processing modes in which an area inside of said marked area is subjected to editing processing; and providing at least one point-out image processing mode in which an area that is marked by the marking signal is subjected to editing processing.

2. The method according to claim 1, comprising:

providing one of said plurality of inside image processing modes as an inside erase mode in which all images inside the marked area are erased; and providing said point-out image processing mode as a print-out area erase mode in which the area that is actually marked on said document by the marking signal is erased.

3. The method according to claim 1 further comprising the step of :
   executing either one of said plurality of inside image processing modes or said point-out image processing mode based on a predetermined characteristic of said marking signal.

4. The method according to claim 3, wherein said step of executing either one of said plurality of inside image processing modes or said point-out image processing further comprises the steps of:
   determining the thickness of said marking signal; and
   selecting said processing mode based on the determined thickness of said marking signal.

5. An image editing method for a digital copier which effects predetermined editing functions on a document which has been marked by a marking signal, comprising the steps of:
   generating a marked area on a document by surrounding a predetermined area of said document with a marking signal having a predetermined characteristic;
   providing a plurality of inside image processing modes in which an area inside of said marked area is subjected to editing processing;
   providing at least one print-out image processing mode in which an area that is marked by the marking signal is subjected to editing processing;
   executing either one of said plurality of inside image processing modes or said point-out image processing mode based on a predetermined characteristic of said marking signal.

6. The method according to claim 5, comprising;
   providing one of said plurality of inside image processing modes as an inside erase mode in which all images inside the marked area are erased; and
   providing said point-out image processing mode as a print-out area erase mode in which the area that is actually marked on said document by the marking signal is erased.

7. The method according to claim 6, wherein said step of executing either one of said plurality of inside image processing modes or said point-out image processing further comprises the steps of:
   determining the thickness of said marking signal; and
   selecting said processing mode based on the determined thickness of said marking signal.

8. The method according to claim 5, wherein said step of executing either one of said plurality of inside image processing modes or said point-out image processing further comprises the steps of:
   determining the thickness of said marking signal; and
   selecting said processing mode based on the determined thickness of said marking signal.

* * * * *